Aug. 11, 1959 P. B. MYERS 2,899,571
SWITCHING CIRCUIT
Filed March 9, 1956
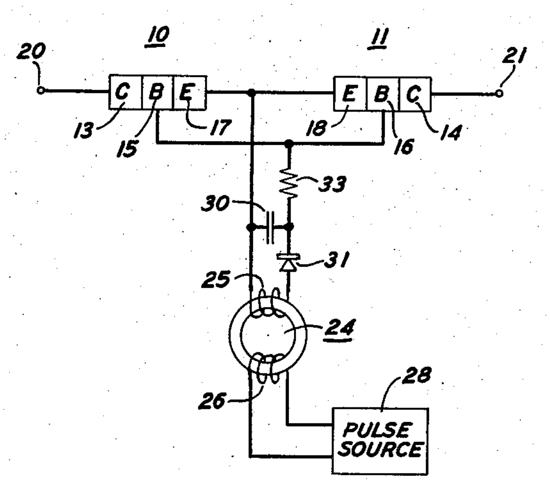
INVENTOR
P. B. MYERS
BY James D. Falk
ATTORNEY 2,899,571

SWITCHING CIRCUIT

Peter B. Myers, Millington, N.J., assignor to Bell Telephone Laboratories, Incorporated, New York, N.Y., a corporation of New York Application March 9, 1956, Serial No. 570,593

10 Claims. (Cl. 307—88.5)

This invention relates to electrical switching circuits and more particularly to electrical gating circuits applicable to information handling systems.

In copending application Serial No. 570,530, filed March 9, 1956, of J. D. Johannesen, P. B. Myers, and J. E. Schwenker there is disclosed a gating network for connecting two terminals together by a low impedance signal path only on application of a control signal to the network. Specifically, as more fully set forth in the above-mentioned application, the gating circuit may comprise a pair of back-to-back connected transistors having common base and common emitter connections, the two terminals of the signal path being connected to the two collectors of the transistors, and a magnetic core having a substantially rectangular hysteresis characteristic, and having an output winding connected between the commonly connected bases and commonly connected emitters and an input winding to which drive pulses are applied.

Such a gating circuit has a number of desirable advantages with respect to rapidity or response both in establishing and disestablishing the series signal path between the terminals, with respect to electrical isolation between the control and signal paths, in attainment of desired impedance levels in its two states of conduction, and in other ways set forth in the application. It is, however, limited in the time period that the signal path may remain established.

In circuits as set forth in the above-identified application a pulse is applied to the input winding of the magnetic core to set the magnetic core in order to activate the gate and establish a low impedance signal path between the gate terminals. The signal path includes a pair of collector-base junctions in series, one of which is normally in a high impedance state to signals of one polarity and the other of which is normally in a high impedance state to signals of the opposite polarity. As the magnetic core switches its state of magnetization, current is forced into the base material of the transistors and injects minority carriers into the vicinity of the collector junctions, thereby reducing them to their low impedance states. This condition will remain only so long as the minority carriers are present. When the switching of the magnetic state of the core is finished, the flow of current from the output winding to the transistor bases will cease and the minority carriers will disappear after a short interval, due to recombination or to their being swept out by the circuit. If, as set forth in the above-identified application, a reset pulse is applied to the input winding of the magnetic core while the signal path is still in its low impedance state, the signal path will be more rapidly disestablished, the minority carriers being swept away due to the matching characteristics of the core and transistors.

In certain gating networks it is desirable, however, to have a signal path which will remain established for a considerable period after a control signal is applied thereto, but which may require the application thereto of successive control signals to remain established. Thus, in certain applications it may be desirable to have a control signal applied to a gating network at successive intervals, the network being activated only as long as those signals are successively applied and being deactivated in the absence of one of the signals.

It is an object of this invention to provide an improved gating circuit.

More specifically it is an object of this invention to increase the time during which the gating circuit of the above-identified Johannesen et al. application may be maintained in its low impedance state.

These and other objects of this invention are attained in one specific embodiment wherein the gating circuit comprises a signal path including a pair of series connected transistors having common base and common emitter connections. The transistors, which may be of the alloy junction type, may be of either n–p–n or p–n–p type providing the correct drive pulse polarity is used, and may, in fact, comprise but a single physical unit. However, a pair of collector junctions are defined, one having a normally high impedance to signals of one polarity and the other a normally high impedance to signals of the opposite polarity.

A magnetic core, which may advantageously be of a square loop material but which in various embodiments of this invention may also be of a soft material, has an output winding connected between the commonly connected bases and commonly connected emitters.

In accordance with an aspect of this invention a shunt capacitor is also connected across the output winding and thus between the emitters and bases, and a series diode is connected between the output winding and the capacitor. A resistance is also advantageously connected between the capacitor and the transistors.

When a drive pulse is applied to the magnetic core, current due to the occurrence of the pulse and the switching of the core is forced both into the base regions of the transistor and into the capacitor to charge it. When the drive pulse terminates, the capacitor contains a stored charge and will discharge slowly through the series resistance and the forward resistances of the emitter-base junctions, providing a supply of minority carriers in the vicinity of the collector-base junctions to maintain those junctions in their low impedance state.

In circuits in accordance with my invention wherein the series diode and shunt capacitor are connected in the gating circuit, the gating circuit can be maintained in its low impedance state continuously by a pulsed or alternating current drive. The requirement for this condition is that the time constant of the shunt capacitor, effective forward resistance of the paralleled emitter-base junctions, and series resistance, if present, be long enough to sustain the low impedance signal path during the period between pulses.

The gating circuit will be returned to its high impedance condition when no drive pulse or signal is applied to it within the period required for discharge of the condenser, plus a short period after removal of the external current flow due to presence of minority carriers in the base material. This period can be accurately determined, if desired. The presence of the diode prevents the resetting or opposite polarity pulses applied to the input winding of the core from sweeping out minority carriers and thus reestablishing the high impedance state of the gating circuit, as described in the above-mentioned application.

The wave form of the driving pulse or signal is not critical and may, in fact, be from an alternating current source, so long as it is capable of charging the capacitor during the time in which the diode conducts.

It is a feature of this invention that a gating circuit comprises a pair of back-to-back series connected transistors and a core having an output winding connected between the commonly connected bases and commonly connected emitters of the transistors, a capacitor being in shunt across the output winding, and a diode in series therewith.

It is another feature of this invention that a resistor be connected between the capacitor and the transistors to limit the current delivered to the transistors by the core on application of a drive pulse thereto and to increase the time constant of the capacitor discharge through the transistors.

It is a further feature of this invention that the core may be driven either by intermittent pulses, occurring at cyclical intervals whereby the gate is returned to its high impedance state on omission of one or more of these pulses, or by an alternating current drive. Accordingly, it is a feature of this invention that the gate may be maintained uninterruptedly in its low impedance condition by repeated application of drive pulses or signals thereto.

A complete understanding of these and other features of this invention may be gained from consideration of the following detailed description, together with the accompanying drawing, the single figure of which is a schematic representation of one specific illustrative embodiment of the invention.

Turning now to the drawing, the specific illustrative embodiment of this invention therein depicted comprises a pair of transistors 10 and 11 each comprising a collector region 13, 14, a base region 15, 16, and an emitter region 17, 18. The transistors are connected back to back in series in the signal path between the gate terminals 20 and 21. They may advantageously be alloy junction transistors of either the p-n-p or n-p-n type.

As disclosed in the above-mentioned application Serial No. 570,530, filed March 9, 1956, of J. D. Johannesen, P. B. Myers, and J. E. Schwenker, the control for the signal path may include a magnetic core 24 having a substantially rectangular hysteresis characteristic, and having an output winding 25 and an input winding 26. The output winding 25 is connected between the base regions 15, 16, which are electrically connected together, and the emitter regions 17, 18, which are electrically connected together. The input winding 26 is connected to a source 28 of signal pulses which serve to switch the state of magnetization of the core 24.

Normally in the signal path between the terminals 20 and 21 the collector-base junction of one of the transistors 10 and 11 presents a high impedance to signals of one polarity, and the collector-base junction of the other transistor presents a high impedance to signals of the opposite polarity. On switching of the magnetic core, current is supplied to the base-emitter junctions of each transistor causing minority carriers to be injected into the vicinity of the collector-base junctions, thereby reducing those junctions to their low impedance state for signals of either polarity.

In circuits in accordance with the above-identified application the collector-base junctions will remain in their low impedance states, thereby keeping the signal path established between the terminals 20 and 21, until either a pulse is applied to the input winding 26 to reset the core 24 and thus cause a sweeping out of the minority carriers, as described in the above-identified application, or the core 24 is fully switched to its set state and the minority carriers injected thereby into the base material disappear. In the first instance the core will not be entirely switched by the drive pulse so that the gate signal path remains established during the entire time period of the drive pulse from the source 28. Advantageously, immediately upon termination of the drive pulse the reset pulse of opposite polarity is applied from the pulse source 28 to the core input winding 26 to attain rapid disestablishment of the signal path between the terminals 20 and 21 despite the presence of a large number of minority carriers adjacent the collector-base junctions.

The above-described arrangements may be advantageously utilized in gating, scanning, or switching networks wherein it is desired to sample a plurality of signal paths at a high sampling frequency, the conducting or low impedance period of each signal path being less than the switching time of the core. In other circuit arrangements, however, it is desired to have a gating network which will remain in its low impedance condition for longer periods of time or continuously and uninterruptedly on occurrence of successive control pulses.

In accordance with the depicted embodiment of this invention this is attained by connecting a capacitor 30 across the output winding 25 of the core 24 and a diode or other rectifying device 31 in series with one end of the winding 25 and between the winding 25 and the capacitor 30. The diode 31 is poled in such direction as only to permit the flow of current which tends to inject minority carriers. Advantageously, a resistor 33 is also connected between the common connection of the capacitor 30 and diode 31 and the common bases 15, 16. The advantages of my invention can readily be seen from the following discussion of the operation of this specific illustrative embodiment.

When the set pulse is applied to the input winding 26, the state of magnetization of the core switches, thereby causing current to flow in the output winding 25 and through the diode 31 to both the common bases 15 and 16 and to the capacitor 30. This current serves to inject minority carriers into the base material adjacent to the collector-base junctions and also to charge the capacitor 30. The resistor 33 advantageously serves to limit the peak current in the base-emitter circuits of the transistor during this time and to assure that most of the current serves to charge the capacitor.

Immediately after the set pulse is applied from pulse source 28 a reset pulse is advantageously applied to reset the core and prepare it for the next possible set pulse. Due to the presence of the diode 31, however, the reset pulse does not cause any current to flow in the transistors 10 and 11 in the signal path. Further, because of the diode 31, the output winding 25 appears to be terminated in an open circuit during the reset pulse period, so that the core 24 is reset quickly.

At this time, however, the injection of minority carriers into the base regions of the transistors 10 and 11 is assured by the energy stored in the capacitor 30. The capacitor 30 serves as a constant source of minority carriers to keep the collector-base junctions in their low impedance states for signals of either polarity for a period of time determined by the time constant of the RC circuit thus defined. This time constant is thus dependent on the size of the capacitor and the values of resistance of the resistor 33 and the forward resistance of the emitter-base junctions. As these values may be accurately determined, the activated period of the gate signal path can be readily determined.

In circuits in accordance with this invention the low impedance period of the signal path may be increased by the order of ten to a hundred times the low impedance period dependent on the switching time and decay time of excess minority carriers alone. Further, as the core can be reset while the signal path remains in its low impedance state, a control signal may be applied intermittently to the input winding of the core to maintain the signal path constantly in its low impedance state and thus maintain a continuous direct connection through the gate between the terminals 20 and 21.

The exact nature and configuration of the pulse source 28 will depend on the utilization of the gating network. If the network is merely to provide an established low impedance path for the duration of an applied signal, the pulse source 28 may advantageously apply an alternating current signal to the input winding 26 and the signal path will remain established between terminals 20 and 21 for the duration of the signal. If, however, the network is to provide a low impedance path for a long period of time on occurrence of a single pulse, but then to return to its high impedance state, the pulse source 28 may apply a single pair of opposite polarity pulses to the input winding 26, assuming the core 24 to be of square loop material. And thirdly, if the path between terminals 20 and 21 is to remain uninterruptedly in its low impedance condition on the cyclic reoccurrence of control pulses, source 28 may apply cyclically timed and recurring pulses to the input winding 26 for the duration that the path is to be established.

It is to be understood that the above-described arrangements are illustrative of the application of the principles of this invention. Numerous other arrangements may be devised by those skilled in the art without departing from the spirit and scope of the invention.

What is claimed is:

1. A gating circuit comprising a pair of similar conductivity type transistors each having a base, an emitter, and a collector, the emitters being electrically connected together, the bases being electrically connected together, a magnetic core having two terminal input and output windings thereon, one terminal of said output winding connected to said electrically connected emitters, diode means connected between the other terminal of said output winding and said electrically connected bases, a capacitor connected across said output winding and said diode means, and means for applying pulses to said input winding to supply current to said transistors and to charge said capacitor.

2. A gating circuit comprising a pair of transistors, each having a collector, an emitter, and a base, said emitters being electrically connected together and said bases being electrically connected together, a magnetic core having an input winding and a two terminal output winding, one terminal of said output winding being connected to said electrically connected emitters, rectifying means in series with the other terminal of said output winding and said electrically connected bases, a capacitor connected across said output winding and rectifying means, and means for applying pulses to said input winding to supply current to said transistors and to charge said capacitor.

3. A gating circuit in accordance with claim 2 further comprising a resistor connected in series between said capacitor and said electrically connected bases.

4. A gating circuit in accordance with claim 2 wherein said core is of magnetic material having a substantially rectangular hysteresis characteristic.

5. A gating circuit comprising a signal path including transistor means defining a pair of series connected transmission junctions having normally high impedances to signals of opposite polarities, respectively, said transistor means further defining a pair of control junctions, and means for maintaining both of said transmission junctions in their low impedance states, said means comprising magnetic means having an output winding connected across said control junctions, a diode in series with said output winding, a capacitor across said diode and output winding, and means for applying pulses to said magnetic means to apply current to said transistor means and said capacitor to charge said capacitor and inject minority carriers into the vicinity of said transmission junctions.

6. A gating circuit comprising a serial signal path including transistor means defining, in the order named, a collector, a base, an emitter means, a base, and a collector, means electrically connecting said bases together, and means for maintaining the collector-base junctions in said signal path in their low impedance state, said last mentioned means including a capacitor connected between said emitter means and said electrically connected bases and pulse means for applying current to said transistor means and to said capacitor to charge said capacitor and to provide minority carriers in the vicinity of said collector-base junctions.

7. A gating circuit in accordance with claim 6 wherein said pulse means includes rectifying means connected to said capacitor.

8. A gating circuit in accordance with claim 6 further including a resistor connected between said capacitor and said transistor means.

9. A gating circuit comprising transistor means defining a pair of oppositely poled collector-base junctions and electrically common base and emitter means, a magnetic core having a two terminal output winding and an input winding, one terminal of said output winding being connected to said electrically common bases, the other terminal of said output winding connected to said emitter means, rectifying means connected in series with said output winding, a capacitor across said output winding and rectifying means, and means for applying pulses to said input winding to charge said capacitor.

10. A gating circuit in accordance with claim 9 further comprising a resistor connected between said capacitor and said electrically common bases.

References Cited in the file of this patent

UNITED STATES PATENTS

| | | |
|---|---|---|
| 2,655,609 | Shockley | Oct. 13, 1953 |
| 2,673,936 | Harris | Mar. 30, 1954 |
| 2,710,928 | Whitney | June 14, 1955 |
| 2,713,675 | Schmitt | July 19, 1955 |
| 2,728,857 | Sziklai | Dec. 27, 1955 |